United States Patent [19]

Nakai

[11] Patent Number: 4,853,606
[45] Date of Patent: Aug. 1, 1989

[54] SECONDARY BATTERY QUICK CHARGING CIRCUIT
[75] Inventor: Shinichi Nakai, Fuchu, Japan
[73] Assignee: Ryobi Limited, Japan
[21] Appl. No.: 187,502
[22] Filed: Apr. 28, 1988
[30] Foreign Application Priority Data
   May 6, 1987 [JP] Japan ............................ 62-68156[U]
[51] Int. Cl.$^4$ .............................................. H02J 7/10
[52] U.S. Cl. ......................................... 320/36; 320/59
[58] Field of Search ............................... 320/35, 36, 59
[56] References Cited
   U.S. PATENT DOCUMENTS
   4,528,492  7/1985  Inaniwa et al. ........................ 320/36
   4,623,832 11/1986  Fujiwara ............................ 320/36 X
   4,712,055 12/1987  Houser, Jr. ............................ 320/35

FOREIGN PATENT DOCUMENTS
   54-134231  3/1953  Japan .
   57-36745   2/1982  Japan .
   59-75728   5/1984  Japan .

Primary Examiner—R. J. Hickey
Attorney, Agent, or Firm—Oliff & Berridge

[57] ABSTRACT

A battery charging circuit includes a thermostat sensing the temperature of the battery as it is charged, a silicon controlled rectifier which when conductive enables charging of the battery and when non-conductive prevents charging of the battery, and a transistor which renders the silicon controlled rectifier non-conductive when the temperature of the battery reaches a predetermined level corresponding to complete charging and is adapted to render the silicon controlled rectifier conductive responsive to a temperature of the battery below the predetermined temperature. When the temperature of the battery is lowered below the predetermined level after the battery has been completely charged, the transistor is rendered non-conductive to ensure that the silicon controlled rectifier is not brought again to the conductive state.

2 Claims, 1 Drawing Sheet

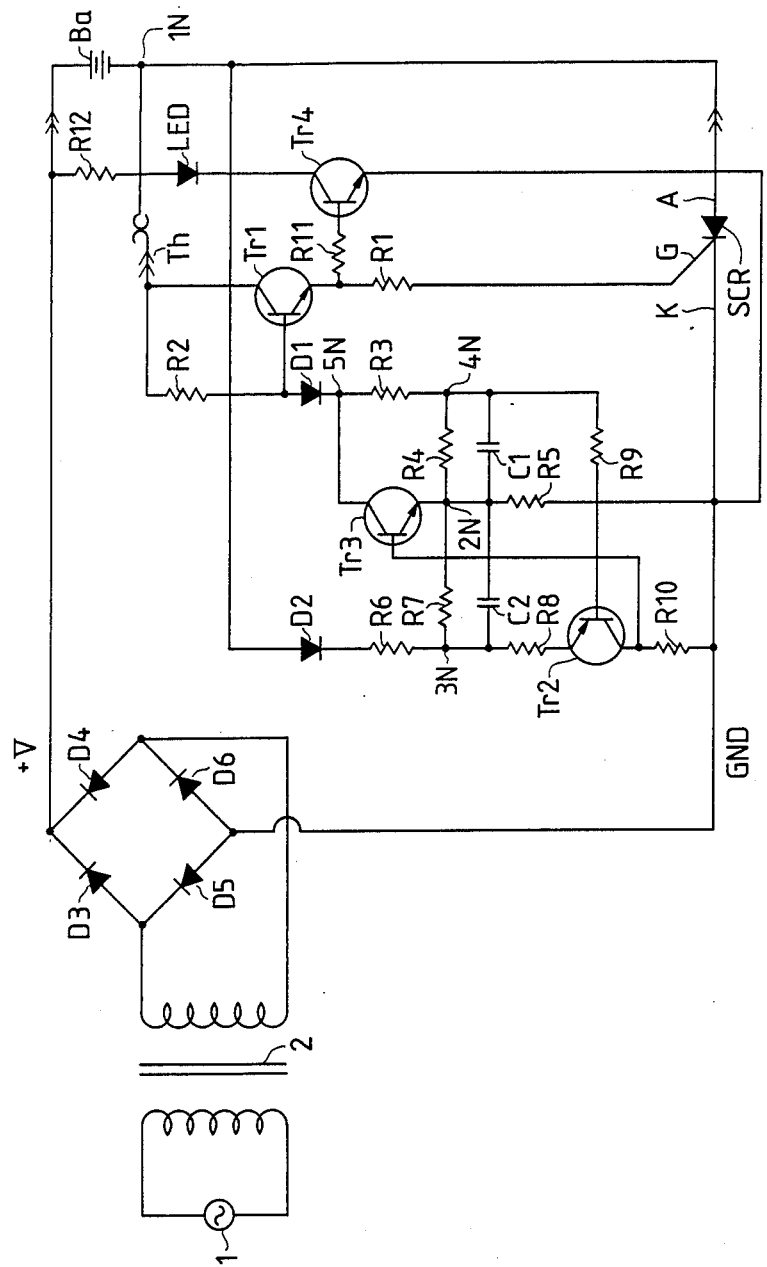

SECONDARY BATTERY QUICK CHARGING CIRCUIT

FIELD OF THE INVENTION

The present invention relates to a circuit for charging a battery. More particularly, the invention relates to a secondary battery quick-charging circuit with a thermostat for overcharge prevention.

BACKGROUND OF THE INVENTION

A secondary battery quick-charging circuit is disclosed in Japanese Laid-Open Utility Model Application No. 134231/1979. According to this application, a silicon controlled rectifier is controlled by the charging current of a capacitor. This arrangement is disadvantageous because in the event the supply voltage varies after the battery has been fully charged and during a period when overcharge is being prevented, a charging current flows in the capacitor and the silicon controlled rectifier is erroneously operated.

Japanese Laid-Open Utility Model Application No. 36745/1982 discloses a secondary battery quick-charging circuit wherein after the battery has been fully charged, a small current continues to flow in a transistor. The disdvantage of this arrangement is the resultant loss of electric power irrespective of the battery charging operation.

In view of the foregoing disadvantages, U.S. Pat. No. 4,623,832 or the corresponding Japanse LaidOpen Utility Model Application No. 75728/1984 discloses an improved secondary battery quick-charging circuit wherein the secondary battery is quickly charged by a large current. The fact that the batter has been fully charged is detected, and the circuit is arranged so that a malfunction does not occur caused by the voltage variation in a voltage source at the time of charging with the small current. This arrangement is still disadvantageous in that a thermostat generates heat attendant to the increase in the charging current and the thermostat is rendered open before the battery has fully charged. This is due to the fact that the circuit includes in a charging path a series circuit comprising the secondary battery, the thermostat and the silicon controller rectifier, and that a current capacity of the thermostat is small.

OBJECTS AND SUMMARY OF THE INVENTION

In view of the foregoing, the present invention has been made to overcome the above-described disadvantages, and accordingly it is an object of the present invention to prevent a malfunction caused by the large charging current.

This and other objects of the invention are accomplished by providing a circuit in which a charging current does not flow through the thermostat. The battery charging circuit is adapted to be connected to a battery-charging voltage source in which a first terminal of the voltage source is connected to a first terminal of a battery. The battery charging circuit of the invention includes control means having a first terminal connected directly to a second terminal of the battery, a second terminal connected to a second terminal of the voltage source, and a third terminal. The control means has a first operation mode for enabling the fast charging of the battery by the voltage source and a second operation mode for preventing the charging of the battery.

The control means is selectively rendered in the first operation mode or the second operation mode in response to a switching signal applied to the third terminal of the control means. The battery charging circuit also includes switching means having a first terminal coupled to the second terminal of the battery for sensing the battery temperature and a second terminal coupled to the third terminal of the control means for applying thereto the switching signal. The switching means is responsive to a predetermined temperature of the battery corresponding to the fully charged state for switching the control means to the second operation mode and is adapted to render the control means in the first operation mode when the battery temperature is below the predetermined temperature. The battery charging circuit further includes inhibiting means coupled to the switching means for inhibiting the switching means to render the control means in the first operation mode when the battery temperature is below the predetermined temperature and when the battery is in the fully charged state.

BRIEF DESCRIPTION OF THE DRAWING

This and other objects, features and advantages of the invention, as well as the invention itself, will become more apparent to those skilled in the art in light of the following detailed description taken in consideration with the accompanying drawing wherein;

The drawing FIGURE is a circuit diagram of a preferred embodiment of the present invention.

DETAILED DESCRIPTION OF THE PREFERRED EMBODIMENT

Referring to the single FIGURE, a source of battery-charging voltage comprises an AC source 1, a transformer 2, and a diode bridge comprising diodes D3, D4, D5, and D6. The rectified output of the diode bridge is the voltage alternating between $+V$ level and a zero level. A battery Ba and a thyrister or a silicon controlled rectifier SCR are connected in series, and the series circuit thereof is coupled to the output of the diode bridge. The silicon controlled rectifier SCR serves as a control means for controlling the charging operation of the battery Ba and has a first operation mode, corresponding to a conductive state of the silicon controlled rectifier, for enabling the fast charging of the battery Ba by the source of battery charging voltage $+V$ and a second operation mode, corresponding to a nonconductive state of the silicon controlled rectifier SCR for preventing the charging of the battery Ba. The silicon controlled rectifier SCR is selectively rendered conductive state or non-conductive state in response to a gate signal applied to the gate G thereof.

A thermostat Th has a first terminal coupled to a first node connecting the battery Ba and the anode A of the silicon controlled rectifier SCR and a second terminal connected to the collector of a transistor Tr1. The thermostat Th senses the temperature of the battery Ba, which is opened when the battery temperature reaches a predetermined level corresponding to a fully charged state and is closed when the battery temperature is below the predetermined temperature. The thermostat Th serves as a control means for controlling the operation of the silicon controlled rectifier SCR responsive to the predetermined temperature of the battery. Between the base and the collector of the transistor Tr1, a resistor R2 is connected. The emitter of the transistor Tr1 is connected through a resistor R1 to the gate G of the silicon controlled rectifier SCR.

The emitter of the transistor Tr1 is further connected through a resistor R11 to the base of a transistor Tr4. A series circuit of a resistor R12, a light emitting diode LED, and the transistor Tr4 is connected in parallel to the battery Ba, all of which together with the resistor R11 constitute a display circuit.

The base of the transistor Tr1, is connected to a series circuit of a diode D1 and resistors R3, R4, and R5. Another series circuit of a diode D2 and resistors R6 and R7 is connected between the first node 1N and a second node 2N connecting resistors R4 and R7. A capacitor C1 is connected in parallel across resistor R4 and a capacitor C2 is connected in parallel across resistor R7. A third node 3N connecting resistors R6 and R7 is connected through a resistor R8 to the emitter of a transistor Tr2. A fourth node 4N connecting resistors R3 and R4 is connected through a resistor R9 to the base of the transistor Tr2. The collector of the transistor Tr2 is connected, on one hand, to a resistor R10, and, on the other hand, to the base of a transistor Tr3. A fifth node 5N connecting diode D1 and resistor R3 is connected to the collector of the transistor Tr3 and the second node 2N is connected to the emitter of the transistor Tr3.

The above-described circuit in the single FIGURE operates as follows. When the battery Ba is connected across the output of the diode bridge, a current flows through the battery Ba, the thermostat Th, the transistor Tr1, the resistor R1, and the gate G of the silicon controlled rectifier SCR, since the thermostat Th is closed due to the low temperature of the battery Ba. In this case, the transistor Tr1 is in a conductive state because the same is biased by the voltage developed across the series circuit of the diode D1, resistors R3, R4, and R5. In response to the current applied to its gate G the silicon controlled rectifier SCR is triggered, whereby the battery Ba starts the charging operation. At the same time, since the current flows through the resistor R11 into the base of the transistor Tr4, the transistor Tr4 is rendered conductive, whereby a current is permitted to flow through the resistor R12, the light emitting diode LED and the transistor Tr4. Accordingly, the light emitting diode LED is lit to indicate that the charging operation is being carried out.

When the battery Ba is fully charged, the battery temperature reaches the predetermined temperature so that the thermostat coupled to the battery Ba is rendered open. As a result, the current does not flow into the gate G of the silicon controlled rectifier SCR. On the other hand, an alternating current is being flowed through the silicon controlled rectifier SCR in accordance with the rectified output voltage in the diode bridge, and the silicon controlled rectifier SCR becomes non-conductive when the alternating current is at a zero level. Accordingly, the silicon controlled rectifier SCR is not brought again to its conductive state.

At this time, the current is not being flowed into the base of the transistor Tr4 so that the transistor Tr4 is rendered non-conductive, whereby the current does not flow in the light emitting diode LED and thus the light is extinguished to indicate the end of the charging operation.

After completion of the charging operation, the battery temperature is lowered as the time passes. When the battery temperature is lowered below the predetermined temperature, the thermostat Th is again closed.

Upon closure of the thermostat Th, the sum of the current flowing through the diode D2 and the resistor R6 and the current discharged from the capacitor C2 are being flowed through the resistors R8 into the transistor Tr2. Accordingly, a current flows in both the resistor R10 and the transistor Tr3, so that the transistor Tr3 is rendered conductive. Because of the conduction of the transistor Tr3, the transistor Tr1 is not biased and is rendered nonconductive. Due to the non-conduction of the transistor Tr1, the current applied to the gate of the silicon controlled rectifier SCR is interrupted and therefore the battery Ba does not start charging operation again. This condition is maintained until the fully charged battery is replaced by another one.

As described above, according to the battery charging circuit of the present invention, since a charging current is not being flowed through the thermostat, a malfunction of the thermostat can be prevented. The thermostat may otherwise be operated erroneously due to the heat generated by the thermostat per se when a large charging current is flowed therethrough.

What is claimed is:

1. A battery charging circuit comprising:
   a first series circuit including a battery which increases in temperature during the charging thereof;
   a thermostat which opens in response to the battery reaching a predetermined temperature corresponding to a full charge of the battery, said thermostat having a first terminal and a second terminal, a first node connecting the battery and the first terminal of said thermostat, and a thyrister having a gate, a cathode and an anode, said anode being connected to said first node;
   a first transistor having a collector connected to the second terminal of said thermostat, an emitter and a base, a first resistor having a first terminal connected to the emitter of said first transistor and a second terminal connected to the gate of said thyrister, and a second resistor connected across the base and the collector of said first transistor;
   a second series circuit connected in series to the base of said first transistor, and comprising a series connection of a first diode, a third resistor, a fourth resistor and a fifth resistor;
   a third series circuit having a first terminal connected to the first node and a second terminal, and comprising a series connection of a second diode, a sixth resistor and a seventh resistor, said second terminal of said third series circuit being connected to a second node connecting said fourth resistor and said fifth resistor;
   a first capacitor connected in parallel to said fourth resistor and a second capacitor connected in parallel to said seventh resistor;
   a second transistor having a collector, an emitter and a base, an eighth resistor having a first terminal connected to a third node connecting said sixth resistor and said seventh resistor and a second terminal connected to the emitter of said second transistor, a ninth resistor having a first terminal connected to a fourth node connecting said third resistor and said fourth resistor and a second terminal connected to the base of said second transistor, a tenth resistor having a first terminal connected to the collector of said second transistor and a second terminal connected to the cathode of said thyrister; and a third transistor having a collector connected to a fifth node connecting said first diode and said third resistor, an emitter connected to said second node, and a base connected to the collector of said second transistor.

2. A battery charging circuit according to claim 1 further comprising a fourth series circuit comprising a display element having a first terminal and a second terminal, a fourth transistor having a collector, an emitter and a base, an eleventh resistor having a first terminal connected to the base of said fourth transistor and a second terminal, a twelfth resistor having a first terminal and a second terminal connected to the first terminal of said display element, the second terminal of said display element being connected to the collector of said fourth transistor and the second terminal of said eleventh resistor being connected to the emitter of said first transistor.

* * * * *